United States Patent
Doi et al.

(10) Patent No.: US 9,851,887 B2
(45) Date of Patent: Dec. 26, 2017

(54) DISPLAY DEVICE AND IMAGE TRANSFORMING METHOD

(71) Applicant: NEC Corporation, Minato-ku, Tokyo (JP)

(72) Inventors: Ryota Doi, Tokyo (JP); Atsushi Kiyota, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/027,574

(22) PCT Filed: Oct. 3, 2014

(86) PCT No.: PCT/JP2014/076545
§ 371 (c)(1),
(2) Date: Apr. 6, 2016

(87) PCT Pub. No.: WO2015/053188
PCT Pub. Date: Apr. 16, 2015

(65) Prior Publication Data
US 2016/0246470 A1  Aug. 25, 2016

(30) Foreign Application Priority Data
Oct. 10, 2013 (JP) .................... 2013-212834

(51) Int. Cl.
*G06F 3/0485* (2013.01)
*G09G 5/00* (2006.01)
(Continued)

(52) U.S. Cl.
CPC .......... *G06F 3/0485* (2013.01); *G06F 1/1615* (2013.01); *G06F 1/1616* (2013.01);
(Continued)

(58) Field of Classification Search
CPC ...... G06F 1/1616; G06F 1/1618; G06F 1/162; G06F 1/1641; G06F 1/1647; G06F 3/147
(Continued)

(56) References Cited

U.S. PATENT DOCUMENTS

2011/0126141 A1* 5/2011 King .................... G06F 1/1616
                                                        715/769
2011/0148739 A1 6/2011 Nurmi
(Continued)

FOREIGN PATENT DOCUMENTS

CN    101183301 A    5/2008
CN    101393514 A    3/2009
(Continued)

OTHER PUBLICATIONS

International Search Report for PCT Application No. PCT/JP2014/076545, dated Jan. 6, 2015.
(Continued)

*Primary Examiner* — Ulka Chauhan
*Assistant Examiner* — Sae Won Yoon

(57) ABSTRACT

A display device includes a plurality of cases having an opening/closing mechanism, a plurality of displays installed in a plurality of cases, and an open-close angle detector configured to detect an open-close angle between a plurality of cases. The display devices carries out a transforming process on a plurality of images based on the open-close angle between the cases such that a plurality of images can be visually recognized as a continuous plane image. Additionally, the display device changes the transforming process depending on a portrait orientation and a landscape orientation. Moreover, it is possible to correct a plurality of images based on a user's position concerning a user's specific part relative to the display device.

10 Claims, 10 Drawing Sheets

(51) Int. Cl.
*G06F 1/16* (2006.01)
*G06F 3/14* (2006.01)
*G09G 3/34* (2006.01)
*G06T 15/30* (2011.01)
*G06T 3/40* (2006.01)
*H04N 5/222* (2006.01)
*G06F 3/048* (2013.01)
*G06F 3/0483* (2013.01)

(52) U.S. Cl.
CPC .......... *G06F 1/1643* (2013.01); *G06F 1/1677* (2013.01); *G06F 3/1423* (2013.01); *G09G 5/00* (2013.01); *G09G 3/3426* (2013.01); *G09G 2310/0232* (2013.01); *G09G 2340/0407* (2013.01); *G09G 2340/0492* (2013.01); *G09G 2340/14* (2013.01); *G09G 2354/00* (2013.01); *G09G 2356/00* (2013.01); *G09G 2380/14* (2013.01)

(58) Field of Classification Search
USPC ................................................. 345/1.1, 619
See application file for complete search history.

(56) References Cited

U.S. PATENT DOCUMENTS

| | | | | |
|---|---|---|---|---|
| 2011/0267291 | A1* | 11/2011 | Choi | G06F 1/1692 345/173 |
| 2012/0115422 | A1* | 5/2012 | Tziortzis | G06F 3/01 455/73 |
| 2012/0235894 | A1 | 9/2012 | Phillips | |
| 2012/0262367 | A1 | 10/2012 | Chiu et al. | |
| 2012/0274540 | A1 | 11/2012 | Inami et al. | |
| 2012/0327133 | A1 | 12/2012 | Eguchi | |
| 2013/0044240 | A1 | 2/2013 | Leskela et al. | |
| 2013/0154971 | A1* | 6/2013 | Kang | G06F 3/0414 345/173 |
| 2014/0009449 | A1* | 1/2014 | Jang | G09G 3/00 345/204 |
| 2014/0055429 | A1* | 2/2014 | Kwon | G09G 3/001 345/204 |
| 2014/0176296 | A1* | 6/2014 | Morgan | G06F 3/011 340/4.13 |

FOREIGN PATENT DOCUMENTS

| | | |
|---|---|---|
| CN | 201541318 U | 8/2010 |
| EP | 2530941 A2 | 12/2012 |
| JP | H11-085108 A | 3/1999 |
| JP | 2001-292415 A | 10/2001 |
| JP | 2005-107681 A | 4/2005 |
| JP | 2005-115069 A | 4/2005 |
| JP | 2009-222951 A | 10/2009 |
| JP | 2010-091764 A | 4/2010 |
| JP | 2011-107711 A | 6/2011 |
| JP | 2012-004798 A | 1/2012 |
| JP | 2012-114739 A | 6/2012 |
| JP | 2012-231274 A | 11/2012 |
| JP | 2013-050547 A | 3/2013 |

OTHER PUBLICATIONS

Chinese Office Action for CN Application No. 201480055115.9 dated Apr. 24, 2017 with English Translation.
Extended European Search Report for EP Application No. EP14853107.2 dated Sep. 28, 2017.

\* cited by examiner

DISPLAY DEVICE AND IMAGE TRANSFORMING METHOD

This application is a National Stage Entry of PCT/JP2014/076545 filed on Oct. 3, 2014 which claims priority from Japanese Patent Application 2013-212834 filed on, Oct. 10, 2013 the contents of all of which are incorporated herein by reference, in their entirety.

TECHNICAL FIELD

The present invention relates to a display device with multiple displays and in particular to an image correcting method for correcting images sequentially displayed on multiple displays.

The present application claims priority on Japanese Patent Application No. 2013-212834 filed Oct. 10, 2013, the entire content of which is incorporated herein by reference.

BACKGROUND ART

Conventionally, engineer have developed display devices with multiple displays configured to sequentially display images. For example, display devices having a two-screen configuration installing displays in two cases having an opening/closing mechanism have been developed. Patent Literature Document 1 displays an "information terminal device", i.e. a folding mobile information terminal configured to process image information depending on an open-close angle between multiple displays. Patent Literature Document 2 discloses a "display device", i.e. an electronic book able to change expansion/reduction ratios of images and directions of displaying images depending on any variation in an open-close angle between two displays. Patent Literature Document 3 discloses a "display device", i.e. a mobile communication device implementing 3D display operations using two screens, which calculates visions depending on opening angles in upper-lower and right-left directions so as to change parameters used for 3D display operations. Patent Literature Document 4 discloses an "information processing device", i.e. an information processing device implementing face recognition processing of images captured using a camera, which displays images according to a rotation angle to a reference axis. Patent Literature Document 5 discloses a "folding mobile terminal" configured to sequentially display images with a line of two displays. Patent Literature Document 6 discloses a "display device" which aims to prevent any shift of a display panel to a casing when a flexible display panel is transformed from a folded condition to an expanded condition.

CITATION LIST

Patent Literature Document

Patent Literature Document 1: Japanese Patent Application Publication No. H11-85108
Patent Literature Document 2: Japanese Patent Application Publication No. 2009-222951
Patent Literature Document 3: Japanese Patent Application Publication No. 2011-107711
Patent Literature Document 4: Japanese Patent Application Publication No. 2012-4798
Patent Literature Document 5: Japanese Patent Application Publication No. 2012-114739
Patent Literature Document 6: Japanese Patent Application Publication No. 2013-50547

SUMMARY OF INVENTION

Technical Problem

The display device of Patent Literature Document 1 displays images being expanded or reduced in a vertical direction or a horizontal direction depending on an open-close angle in order to prevent difficulty of viewing display screens due to a small open-close angle between two casings. Thus, it is possible to prevent difficulty of viewing due to strained aspect ratios for displaying characters and images when a user slantingly views display screens. However, the display device of Patent Literature Document 1 is designed to implement image transformation for each screen, which in turn causes a problem of reducing visibility. When a single image is displayed using two screens, for example, a certain open-close angle may cause bending between screens on the border of a hinge connecting two casings. This situation may cause motion sickness for each user scrolling images with screens. In short, it is difficult to secure good visibility for images displayed with multiple displays.

The present invention is made to solve the above problem, and therefore the present invention aims to provide a display device and an image correcting method for correcting images sequentially displayed with multiple displays, thus improving visibility.

Solution to Problem

A first aspect of the present invention is directed to a display device including a plurality of cases having an opening/closing mechanism, a plurality of displays installed in a plurality of cases, an open-close angle detector configured to detect an open-close angle between a plurality of cases, and a controller configured to carry out a transforming process on a plurality of images, displayed on a plurality of displays, based on the open-close angle detected by the open-close angle detector such that a plurality of images can be visually recognized as a continuous plane image.

A second aspect of the present invention is directed to an image transforming method adapted to a plurality of images displayed on a plurality of displays installed in a plurality of cases having an opening/closing mechanism, including a step of detecting an open-close angle between a plurality of cases, and a step of carrying out a transforming process on a plurality of images displayed on a plurality of displays based on the open-close angle such that a plurality of images can be visually recognized as a continuous plane image.

A third aspect of the present invention is directed to a program executing a transforming process on a plurality of images displayed on a plurality of displays installed in a plurality of cases having an opening/closing mechanism, implementing a step of detecting an open-close angle between the plurality of cases, and a step of carrying out the transforming process on a plurality of images displayed on a plurality of displays based on the open-close angle such that a plurality of images can be visually recognized as a continuous plane image.

Advantageous Effects of Invention

The present invention carries out an image transforming process depending on an open-close angle between two displays such that a user can visually recognize a plane image sequentially connecting two images displayed with two displays having an opening/closing mechanism. Additionally, it is possible to automatically correct displayed images subjected to bending at a user's viewing position relative to two displays such that a user can visually recognize a plane image sequentially connecting two images, thus improving user's visibility.

DESCRIPTION OF EMBODIMENTS

Figure 1:
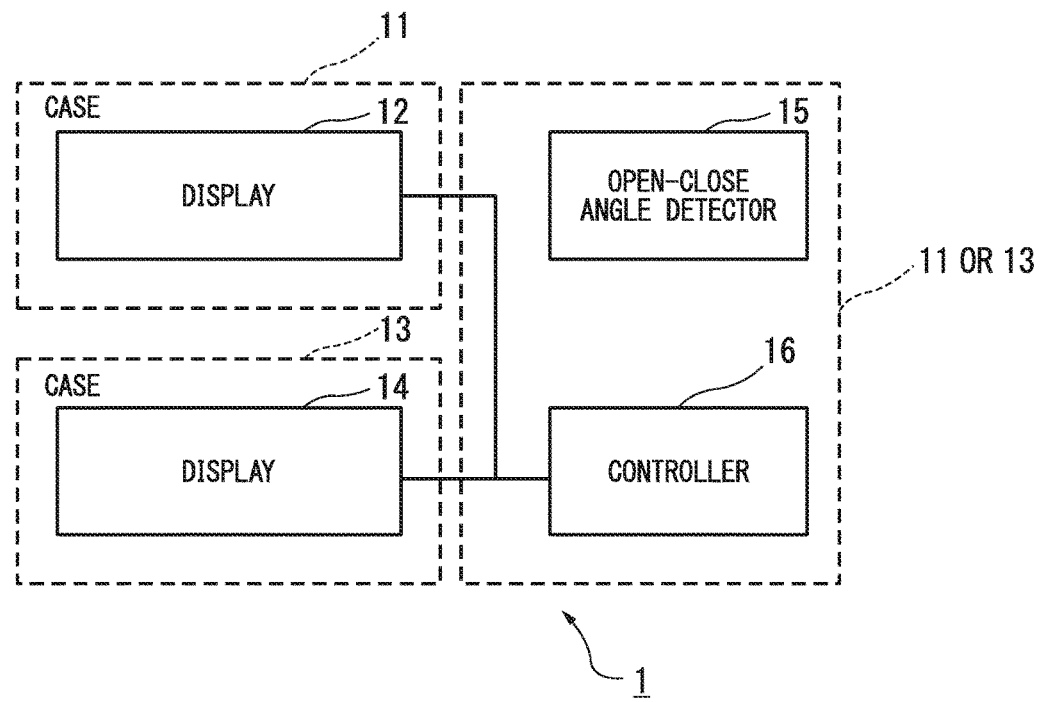
FIG. 1 is a block diagram showing the configuration of a display device according to one embodiment of the present invention.
Figure 2:
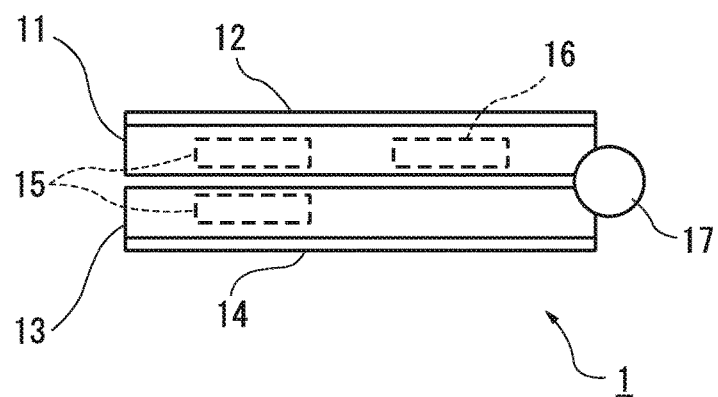
FIG. 2 is a side view showing an external appearance of the display device according to one embodiment of the present invention.
Figure 3:
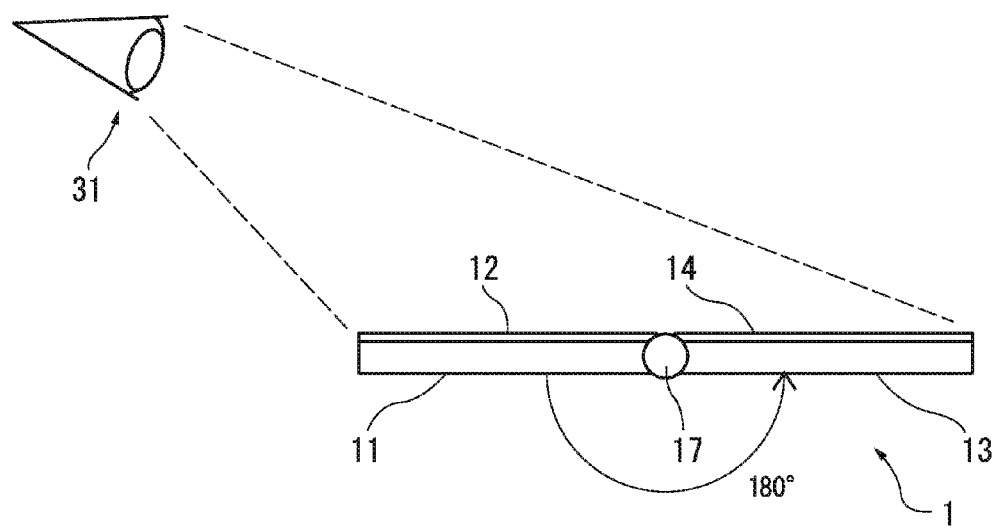
FIG. 3 is a side view showing an external appearance of the display device having two cases being opened at 180°.
Figure 4:
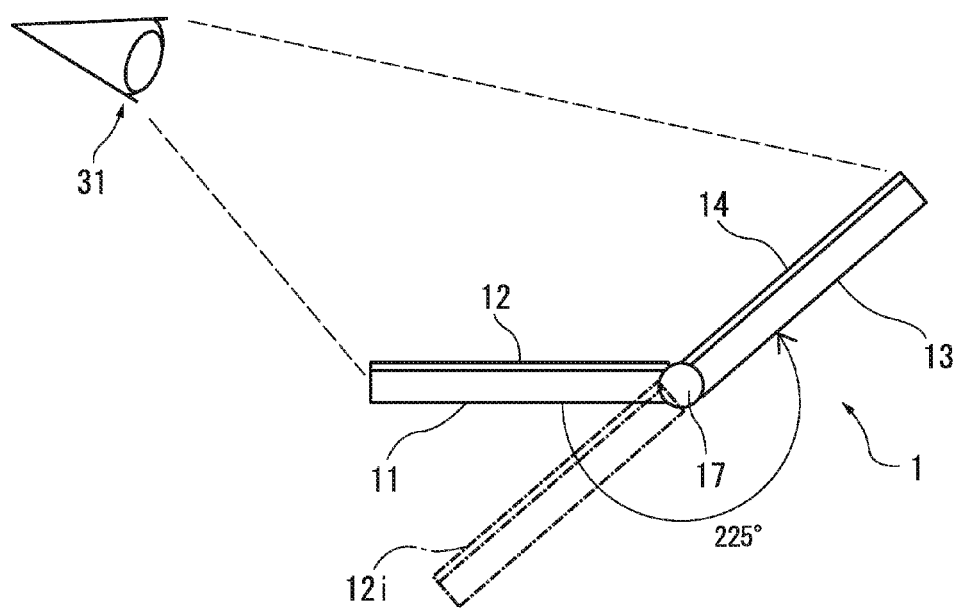
FIG. 4 is a side view showing an external appearance of the display devices having two cases being opened at 225°.

The present invention will be described in detail by way of examples with reference to the accompanying drawings. FIG. 1 is a block diagram showing the configuration of a display device 1 according to one embodiment of the present invention. FIGS. 2 to 4 are side views showing the external appearance of the display device 1. The display device 1 includes a case 11, a display 12, a case 13, a display 14, an open-close angle detector 15, and a controller 16.

As shown in FIGS. 2 to 4, the cases 11 and 13 are connected using a hinge 17 in a free open-close manner. FIG. 2 shows the display device 1 when the cases 11 and 13 are closed; FIG. 3 shows the display device 1 when the cases 11 and 13 are opened at 180°; and FIG. 4 shows the display device 1 when the cases 11 and 13 are opened at 225°. The case 11 includes the display 12 while the case 13 includes the display 14. Additionally, the open-close angle detector 15 and the controller 16 are installed in one of or both of the cases 11 and 13.

The displays 12 and 14 are display devices having liquid crystal panels. The displays 12 and 14 display images according to control signals supplied from the controller 16. As shown in FIG. 2, it is possible to turn the displays 12 and 14 to the exterior of the display device 1 when the cases 11 and 13 are closed.

The open-close angle detector 15 detects an open-close angle between two cases 11 and 13. For example, the open-close angle detector 15 can be configured using two geomagnetic sensors. That is, geomagnetic sensors are installed in the cases 11 and 13. Each geomagnetic sensor detects an angle formed about the hinge 17. The controller 16 calculates an angle between the cases 11 and 13 based on two angles detected by two geomagnetic sensors. For example, it is possible to detect an angle between the cases 11 and 13 in units of five degrees. In this connection, the method of detecting an angle between the cases 11 and 13 is not necessarily limited to the above method using geomagnetic sensor; hence, it is possible to employ any angle detecting technology already known.

The controller 16 can be configured using a CPU (i.e. a central processing unit) and a volatile or non-volatile storage device. For example, the controller 16 controls the displays 12 and 14 to display images based on image information stored in a non-volatile storage device. In this case, the controller 16 transforms images displayed on the displays 12 and 14 depending on an open-close angle between the cases 11 and 13, which is detected by the open-close angle detector 15, such that a user can visually recognize a plane image sequentially connecting two images displayed on the displays 12 and 14.

As shown in FIG. 3, both the display face of the display 12 installed in the case 11 and the display face of the display 14 installed in the case 13 are disposed in the same plane when the cases 11 and 13 are opened at 180°. As shown in FIG. 4, the display face of the display 12 and the display face of the display 14 are bent on the border of the hinge 17 when an angle between the cases 11 and 13 exceeds 180°. In the bent condition, when a user concurrently scrolls images on the displays 12 and 14, a user may visually recognize images being scrolled in different directions on the border of the hinge 17 in view of a user's eye 31. In this case, a difference may occur between a user's manipulating sensation of scrolling images in the same direction and a user's visual sensation, thus causing motion sickness for a user.

For this reason, the controller 16 transforms an image on the display 12 such that a user can visually recognize the display 12 being disposed at a dashed-line position (i.e. a virtual position of a display 12i) in view of a user's eye 31. That is, the controller 16 transforms at least one of images on the displays 12 and 14 depending on an open-close angle detected by the open-close angle detector 15 such that a user can visually recognize the display face of the display 12 and the display face of the display 14 being disposed in the same plane.

Owing to the image transforming process, the display device 1 causes a user to visually recognize images on the displays 12 and 14 being subsequent to each other in the same plane (i.e. a single large screen). Thus, it is possible to match a user's manipulation sensation with a user's visual sensation; hence, it is possible to prevent motion sickness of a user scrolling images on two screens. The controller 16 carries out an image transforming process by executing a predetermined program. The details of the image transforming process will be described later with reference to FIGS. 5 to 16.

The display device 1 of the present embodiment is not necessarily limited to the configuration shown in FIGS. 1 to 4. For example, it is possible to install three or more cases in the display 1. Alternatively, it is possible to install a camera, serving as a position detector configured to detect a user's position and having a function of capturing a user's face or the like, in the hinge 17 of the display 1. Additionally, it is possible for the display device 1 to change the image transforming process depending on a user's position (or a user's eye position) based on an image captured by a camera.

In the display device 1, it is possible to provide a touch panel integrally connecting the displays 12 and 14 as an input device of inputting a user's operation on screen, or it is possible to provide another input device, such as a switch and a cursor key, independently of the displays 12 and 14. Alternatively, it is possible to install an acceleration sensor in the display device 1 so as to implement a function (or an orientation detector) of detecting an orientation of the display device 1. Additionally, it is possible to install a wired or wireless communication device in the display device 1 so as to implement a function of obtaining desired information from an external device. Moreover, it is possible to employ flexible displays, serving as the displays 12 and 14, integrally formed on a single flexible substrate.

Figure 5:
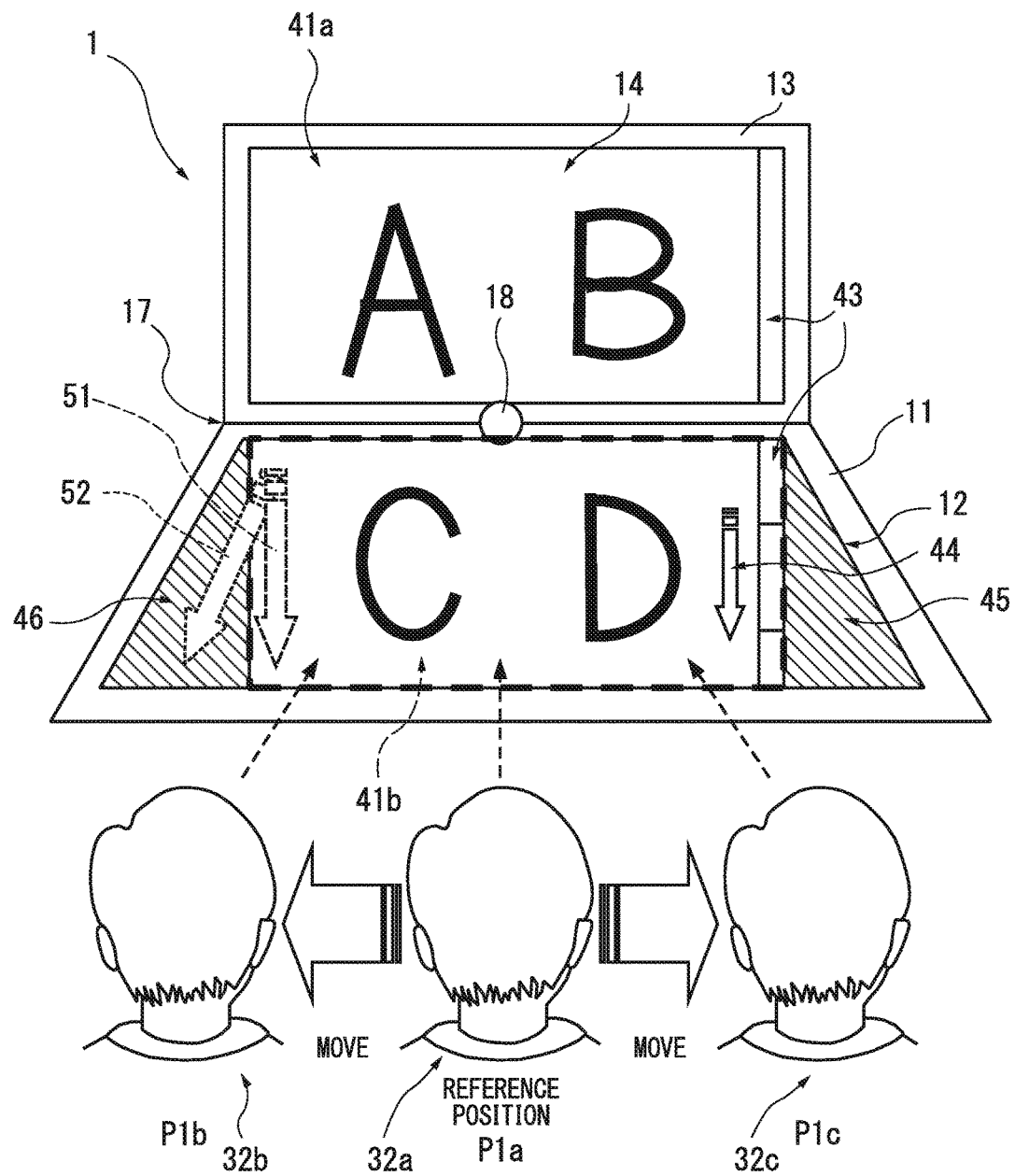
FIG. 5 schematically shows an external appearance and displayed images of the display device having an open-close angle of 180° or more in a portrait orientation.
Figure 6:
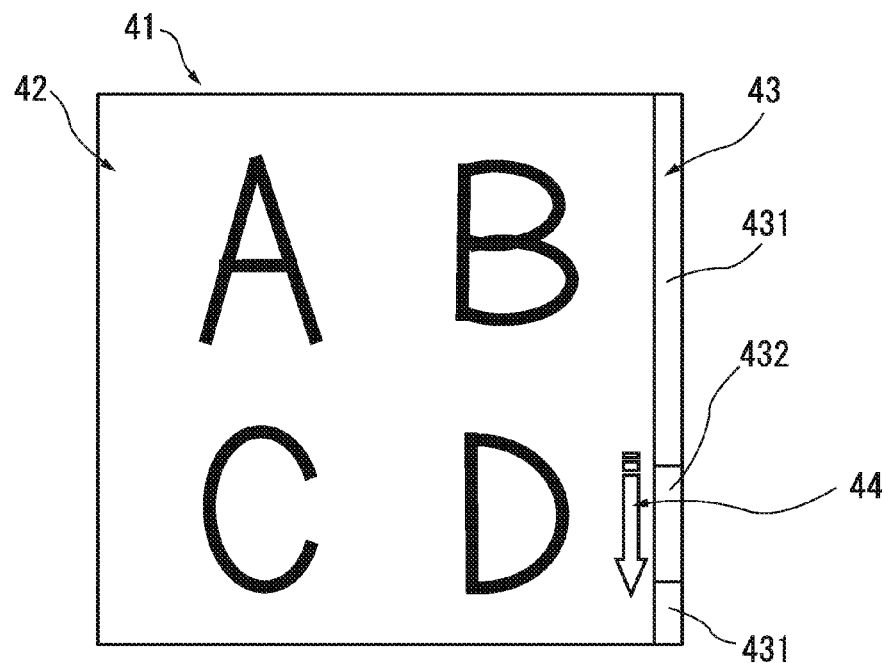
FIG. 6 shows images displayed with the display device before a transforming process.
Figure 7:
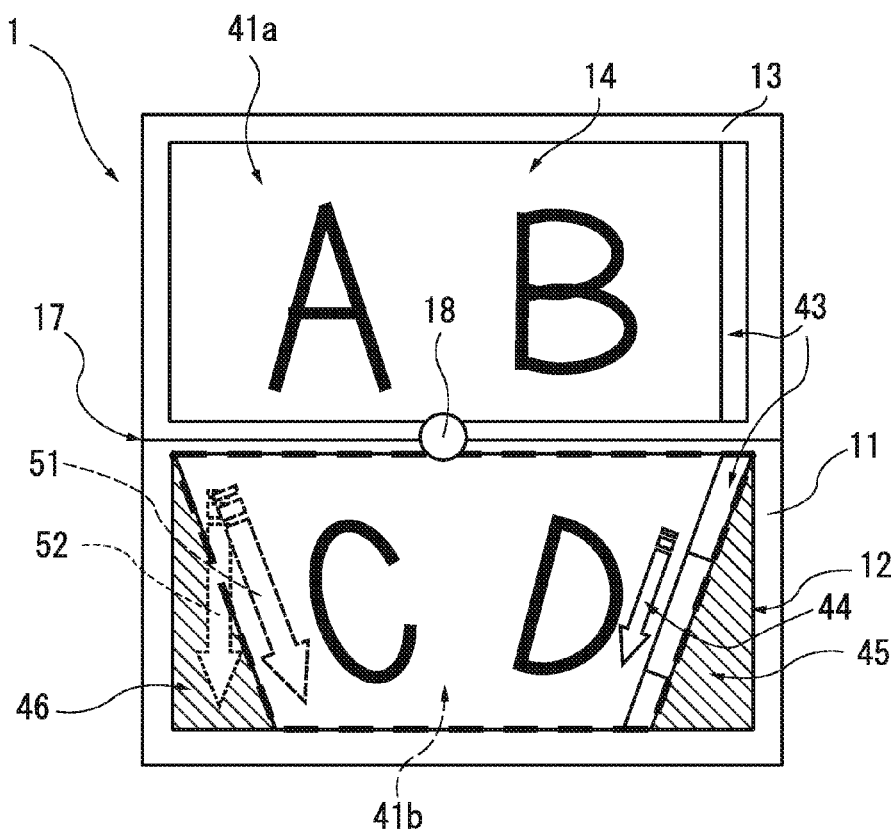
FIG. 7 shows images displayed with the display device having an open-close angle of 180° in a portrait orientation.

Next, a transforming process of transforming images displayed on two screens in the display device 1 shown in FIGS. 1 to 4 in a portrait orientation, in which the cases 11 and 13 are opened at an angle of 180° or more, will be described with reference to FIGS. 5 to 7. FIG. 5 schematically shows an external appearance and displayed images of the display device 1 in view of a user's eye 32a disposed at a reference position P1a (i.e. the front side of the display device 1). FIG. 6 shows an image 41 before transformation. FIG. 7 shows displayed images, directly corresponding to the displayed images shown in FIG. 5, when an angle between the cases 11 and 13 is set to 180°. The display device 1 shown in FIGS. 5 and 7 is further equipped with a camera 18, which is not shown in FIGS. 1 to 4, which is attached to the hinge 17 in the vicinity of the center position. An image 41 shown in FIG. 5 includes a plane image 42 and an image of a scroll bar (hereinafter, referred to as a scroll bar 43). The image 41 includes an arrow image 44, indicating the scrolling direction, being superposed on the plane image 42. The scroll bar 43 includes a scroll shaft 431 and a scroll box 432. In this connection, images (not shown) subsequent to each other in the upper or lower direction toward the drawing sheet will be prepared for the plane image 42.

FIG. 5 shows an image after transformation which is rendered such that the display face of the upper case 13 will be disposed approximately perpendicular to the sight line of a user 32a when the display device 1 is opened at an angle of 180° or more between the cases 11 and 13 on the condition that the lower case 11 is placed on a stand. In this case, the user 32a may manually adjust the inclination of the upper case 13 in line with his/her sight line. The controller 16 transform images by switching the image processing process between the portrait orientation and the landscape orientation of the display device 1. The following description refers to the displayed image of the display device 1 in the portrait orientation; hence, the displayed image in the landscape orientation will be described later. To switch the image transforming process, the controller 16 may detect the portrait orientation with the cases 11 and 13 by use of an orientation detector (not shown) configured of an acceleration sensor. Alternatively, the user 32a may set the portrait orientation by carrying out a predetermined operation on the display device 1.

In FIG. 5, the controller 16 displays an image 41a, i.e. an appropriately upper half of the plane image 41 of FIG. 6, on the display 14 of the upper case 13 without using a transforming process. Additionally, the controller 16 displays an image 41b, which is produced by transforming an approximately lower half of the plane image 41, on the display 12 of the lower case 11 such that a user can visually recognize the image 41b being subsequent to the displayed image 41a of the upper case 13 in the same plane. The image 41b after transformation is encompassed by bold dotted lines in the displayed image shown in FIGS. 5 and 7. In the image displayed on the screen of the display 12 of the lower case 11, as shown in FIG. 7, pixel positions will be inwardly transformed (i.e. compressed) as they depart from the hinge 17 in the lower direction. That is, the controller 16 increases horizontally-compressed ratios at pixel positions which depart from the hinge 17 (i.e. the center of an open/close operation of the cases 11 and 13) in the upper direction or the lower direction. Additionally, the controller 16 controls image data using software so as to change an image-compressed ratio depending on an open-close angle between the cases 11 and 13.

The controller 16 changes a scrolling direction depending on transformed images, which a user can visually recognize as a continuous plane image, (i.e. along an image transforming direction). In FIGS. 5 and 7, an arrow 51 indicates a scrolling direction after an image transforming process while an arrow 52 indicates a scrolling direction before an image transforming process. The controller 16 scrolls and displays the images 41a and 41b by way of a predetermined user's operation applied to a predetermined operator installed in the display device 1. The display device of the present embodiment includes an operator such as a touch panel integrally formed with the displays 12 and 14. In this case, a scroll operation should be made in a direction, indicated by the arrow 51 in FIGS. 5 and 7, with an angle by which the touch position of a user's finger on the touch panel will be changed inwardly of the touch position applied to an image before transformation as the user's touch position departs from the hinge 17 in the upper or lower direction. This angle increases as the angle between the cases 11 and 13 becomes larger. Herein, the scroll bar 43 and the arrow 44 included in the images 41a or 41b serve as the information visually notifying a user of a scrolling direction. The notification information allows a user to easily recognize a scrolling direction within a screen of displaying images after transformation.

When displaying the image 41b after transformation on the display 12, a pair of displayable spaces 45 and 46 (see hatching areas in FIGS. 5 and 7) is formed on both sides of the compressed image 41b. The controller 16 may control the display 12 to display any gadget (e.g. images representing dates and weathers) in the displayable spaces 45 and 46. Herein, gadgets are small-size applications, e.g. software applications for updating and displaying any information such as dates and weathers in a predetermined time interval.

Using the displays 12 and 14 having direct-type LED backlights, for example, the controller 16 may control the display 12 to turn off the backlight directly under the displayable spaces 45 and 46. Using multiple displayable spaces, the controller 16 may display gadgets while turning off the backlight. Alternatively, it is possible to reduce light without completely turning off the backlight. That is, the controller 16 may set displayable spaces, which occurs due to an image transforming process, to display areas of displaying predetermined applications, or the controller 16 may inhibit displayable spaces from being shown on screens.

Figure 8:
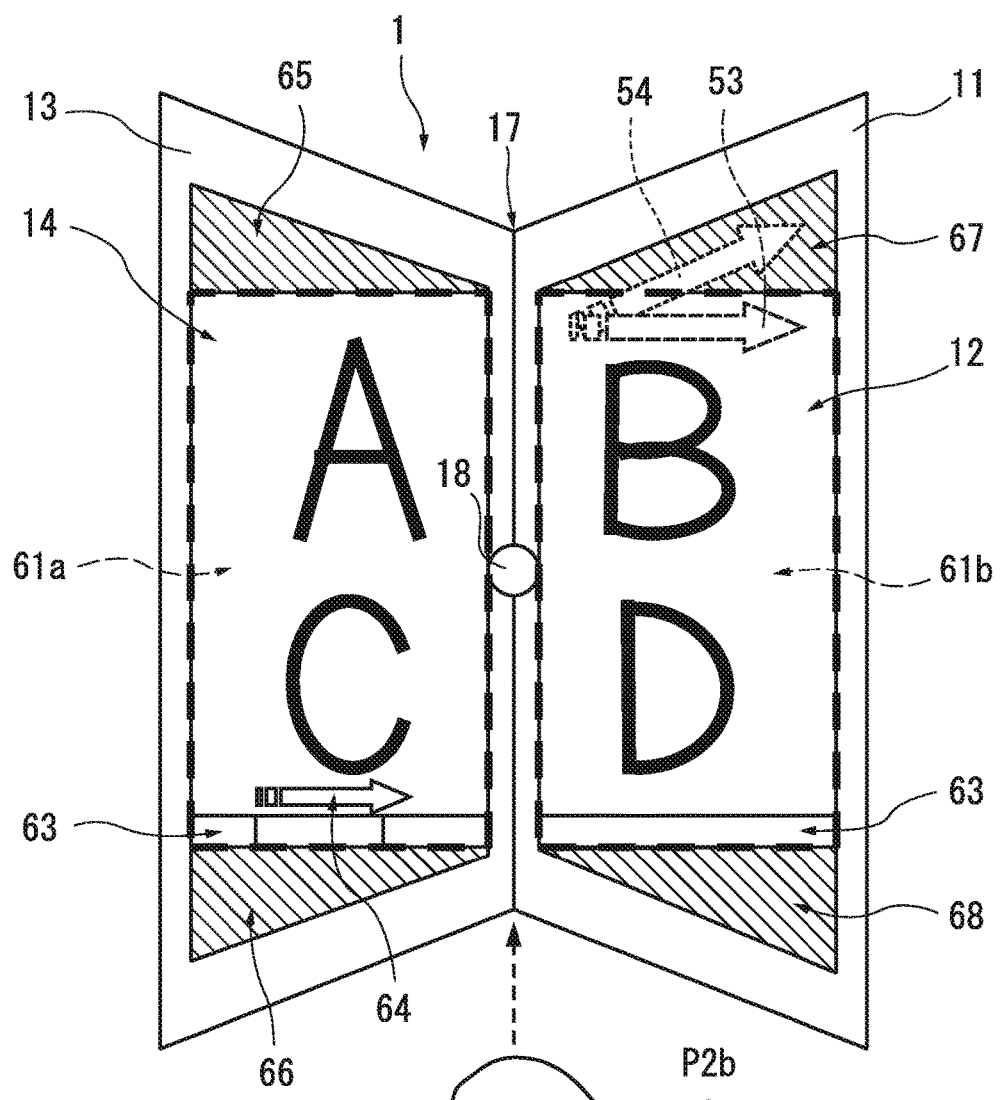
FIG. 8 schematically shows an external appearance and displayed images of the display device having an open-close angle of 180° or more in a landscape orientation.
Figure 9:
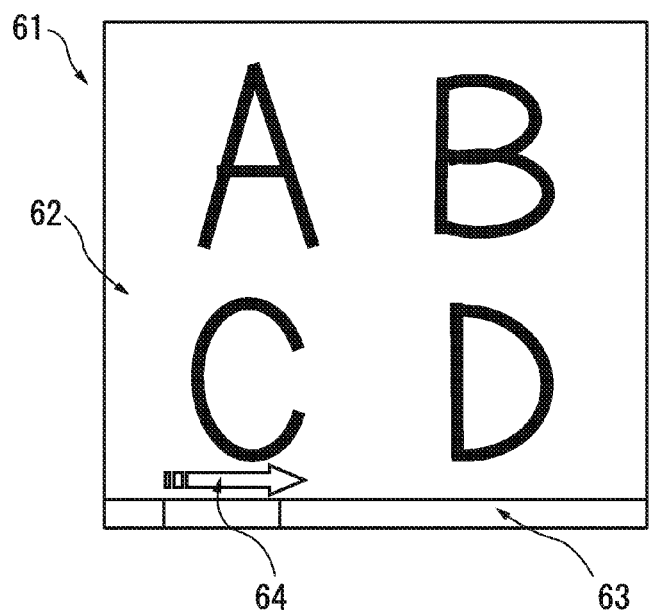
FIG. 9 shows images displayed with the display device before a transforming process.
Figure 10:
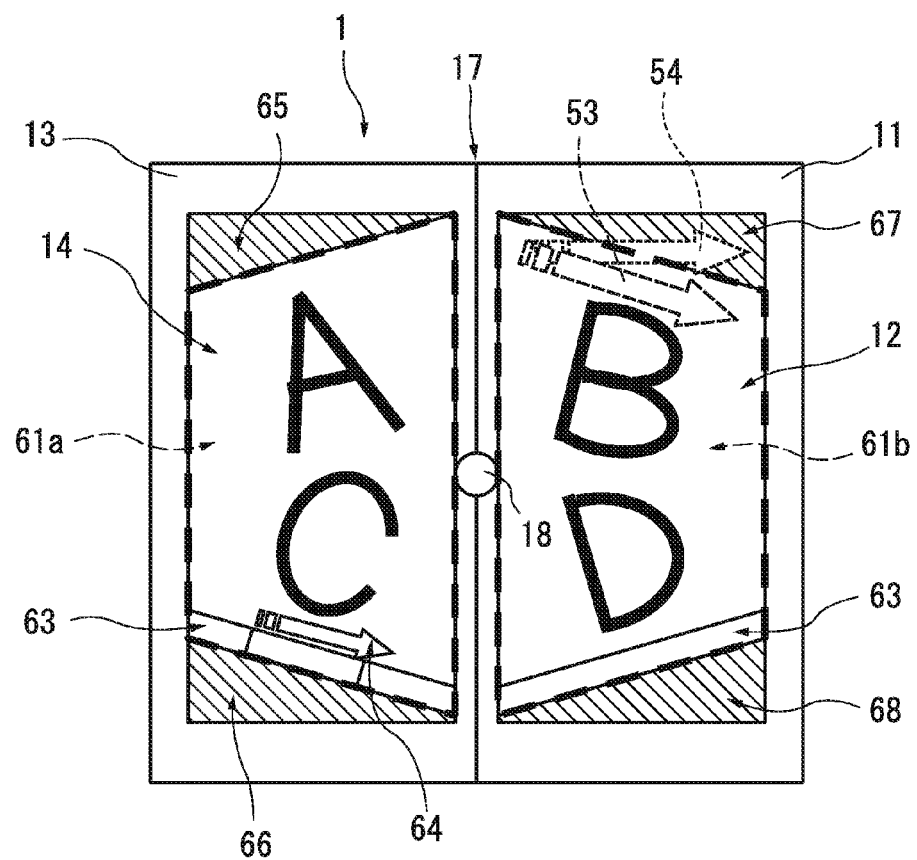
FIG. 10 shows images displayed with the display device having an open-close angle of 180° in a landscape orientation.

Next, examples of transformed images displayed on the display device 1 shown in FIGS. 1 to 4 in a landscape orientation, in which the cases 11 and 13 are opened at an angle of 180° or more, will be described with reference to FIGS. 8 to 10. FIG. 8 schematically shows an external appearance and displayed images of the display device 1 in view of a user's eye 32. FIG. 9 shows an image before transformation. FIG. 10 shows a displayed image, directly corresponding to the displayed image shown in FIG. 8, on the display device 1 in which the cases 11 and 13 are opened at an angle of 180°. The display device 1 shown in FIGS. 8 to 10 is equipped with the camera 18, which is not shown in the display device 1 of FIGS. 1 to 4, which is attached to the hinge 17 in the vicinity of the center area. FIG. 9 shows an image 61 including a plane image 62 and a scroll-bar image 63 (hereinafter, referred to as a scroll bar 63). The image 61 includes an arrow image 64, indicating a scrolling direction, being superposed on the plane image 62. Additionally, images (not shown) subsequent to the left or right of the image of FIG. 9 are prepared for the plane image 62.

FIG. 8 shows a displayed image on the display device 1, in which the cases 11 and 13 are opened at an angle of 180° or more, when the user 32 holds the display device 1 to locate the hinge 17 at the center in front of the user 32. Herein, the user 32 holds the display device 1 to locate the hinge 17 approximately perpendicular to his/her sight line. For example, the controller 16 uses an orientation detector (not shown), configured of an acceleration sensor, to detect the landscape orientation of the cases 11 and 13 so as to transform images according to an image transforming process which is switched from the portrait orientation to the landscape orientation.

In FIG. 8, the controller 16 controls the display 14 of the left-side case 13 to display an image 61a which is produced by transforming an approximately left half of the plane image 41 shown in FIG. 9. Additionally, the controller 16 controls the display 12 of the right-side case 11 to display an image 61b which is produced by transforming an approximately right half of the plane image 41 such that the user 32 can visually recognize the image 61b subsequent to the image 61a. In FIGS. 8 and 10, the images 61a and 61b after transformation are encompassed by bold dotted lines.

In the landscape orientation of the display device 1, as shown in FIG. 8, the controller 16 transforms the left image 61a and the right image 61b by the same angle. That is, the controller 16 transforms and displays the images 61a and 61b with the display 14 of the case 13 and the display 12 of the case 11 such that the user 32 can visually recognize a plane image sequentially connecting the left image 61a and the right image 61b. As shown in FIGS. 8 and 10, the left image 61a and the right image 61b are transformed (or compressed) inwardly of the image 61 before transformation at pixel positions which depart from the hinge 17. That is, the controller 16 increases vertically-compressed ratios at pixel positions which depart from the hinge 17 in a horizontal direction. Additionally, the controller 16 controls an image-compressed ratio depending on an open-close angle between the cases 11 and 13 by way of software.

In the landscape orientation similar to the portrait orientation of the display device 1, the controller 16 changes a scrolling direction depending on transformed images which a user can visually recognize as a plane image continuing in a left-right direction. As shown by an arrow 53 in FIGS. 8 and 10, a scroll operation should be made in a direction with an angle by which the touch position of a user's finger on the touch panel will be changed inwardly of the touch position (i.e. a direction of an arrow 54) applied to an image before transformation as the user's touch position departs from the hinge 17 in the left-right direction. This angle increase as the angle between the cases 11 and 13 becomes larger. Additionally, the controller 16 displays the information notifying a user of a scrolling direction (i.e. the scroll bar 63 and the arrow 64). This makes it possible for a user to recognize a scrolling direction on the screen displaying an image after transformation. Upon displaying the images 61a and 61b after transformation on screens, a set of displayable spaces 65 to 68 is formed in upper and lower vacant areas. At this time, the controller 16 may display gadgets (e.g. images representing dates and weathers) in the displayable spaces 65 to 68, or the controller 16 may turn off the backlight.

Figure 11:
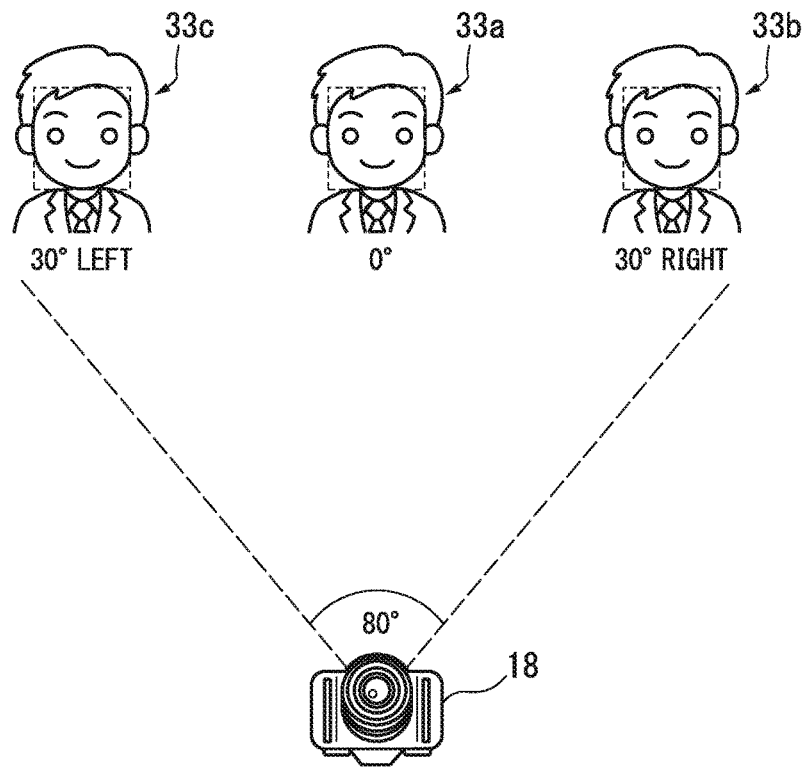
FIG. 11 schematically shows positions of a user moving in a right-left direction viewed by a camera of the display device in the portrait orientation shown in FIG. 5.
Figure 12:
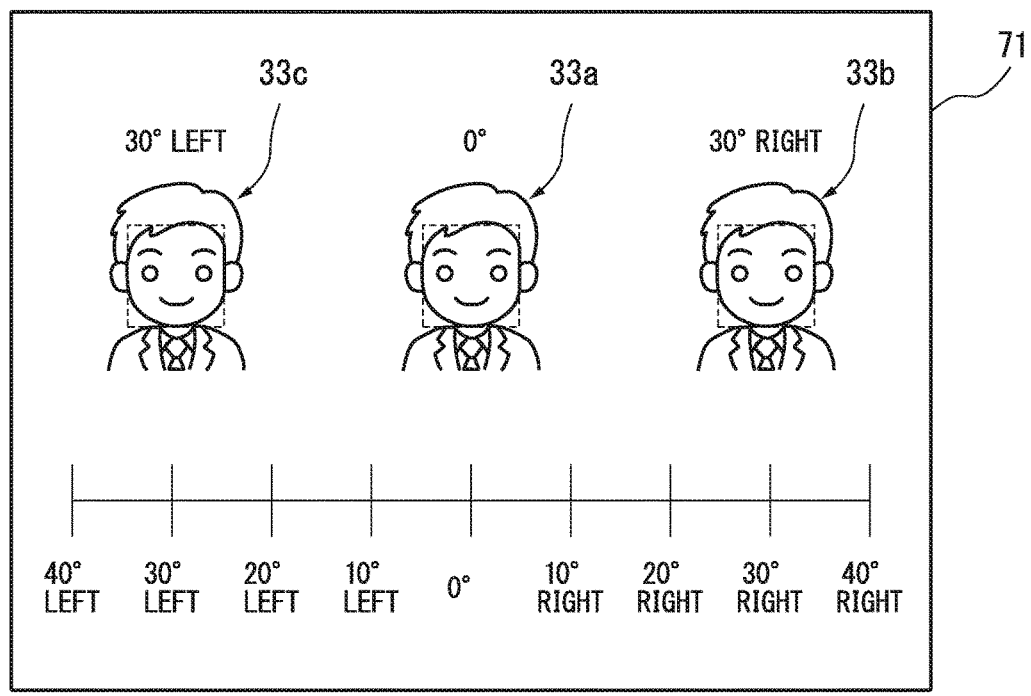
FIG. 12 schematically shows images of a user, moving in a right-left direction, captured by a camera of the display device in the portrait orientation shown in FIG. 5.
Figure 13:
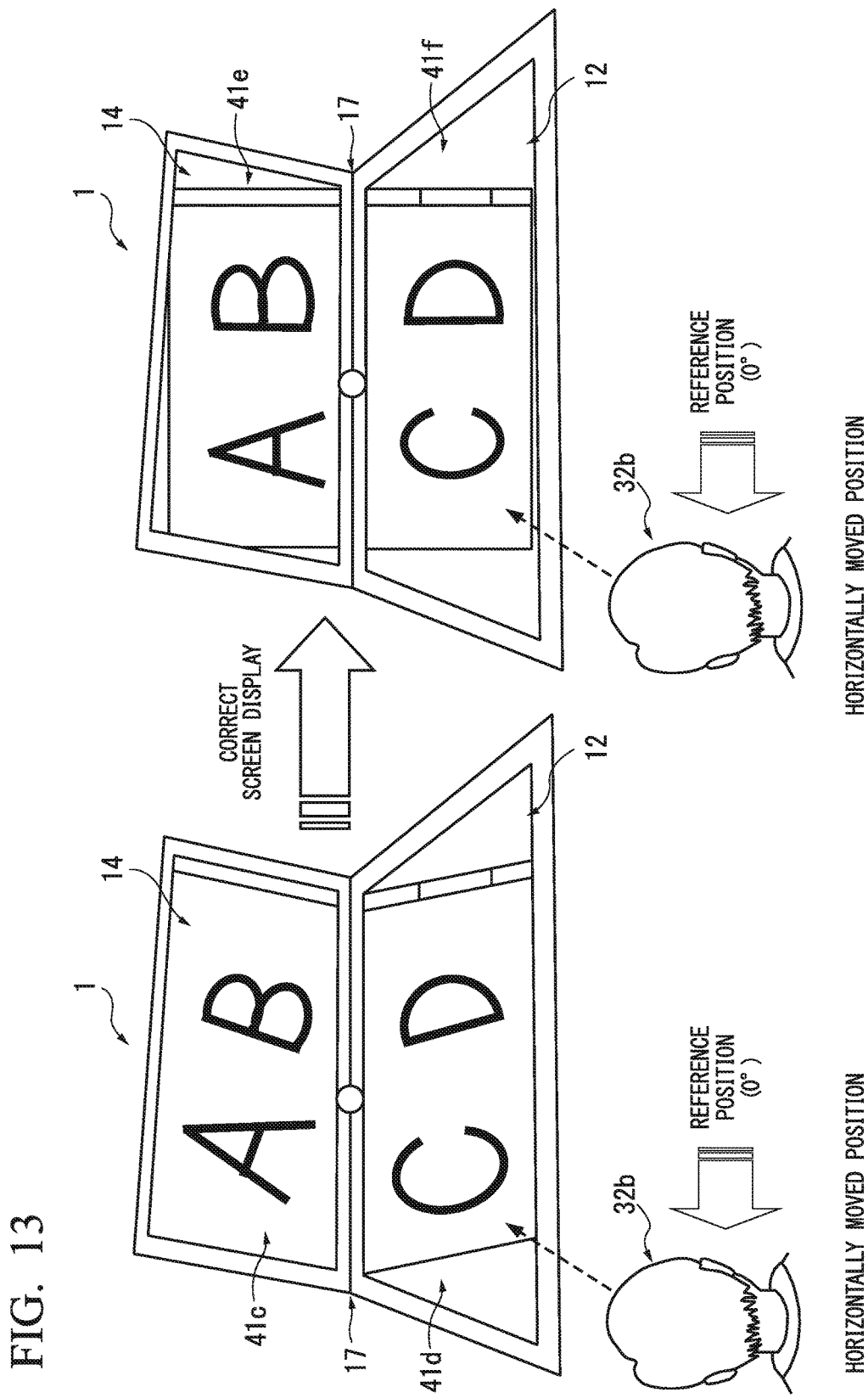
FIG. 13 is an explanatory diagram used to explain a correcting process of images, depending on a user moving in a horizontal direction, displayed with the display device in the portrait orientation shown in FIG. 5.

Next, a correcting process for an image transforming process, which the controller 16 carries out in response to a user's position detected by the camera 18 when the user 32a disposed at a reference position P1a moves to a position Pb1 or a position Pbc, will be described with reference to FIG. 5 and FIGS. 11 to 13. As shown in FIG. 5, a study will be made with respect to the case where a user's eye or a user's face moves in a direction perpendicular to a scrolling direction (i.e. a direction of the arrow 51) so as to move from the reference position P1a to the position P1b or the position P1c. In this case, a user 32b or 32c moved to the position P1b or P1c cannot visually recognize a continuous plane image since images displayed on the displays 12 and 14 are bent at the hinge 17 in a horizontal direction. The left-side illustration of FIG. 13 shows images 41c and 41d (i.e. images before correction) displayed on the displays 12 and 14 of the display device 1 in view of the user 32b at the position P1b. The right-side illustration of FIG. 13 shows images 41e and 41f (i.e. images after correction) displayed on the displays 12 and 14 of the display device 1 in view of the user 32b at the position P1b. The image 41c of the display 14 is an image corresponding to the image 41a of FIG. 5 viewed by the user 32b, while the image 41d is an image corresponding to the image 41a of FIG. 5 viewed by the user 32b. The user 32b after movement may visually recognize that the images 41c and 41d are not subsequent to each other since the user 32a moves from the reference position P1a to the position P1b. Thus, the controller 16 generates the images 41e and 41f which can be visually recognized as a continuous plane image based on the captured information of the camera 18. In this case, the controller 16 may generates the images 41e and 41f by correcting the images 41c and 41d, or the controller 16 may generates the images 41e and 41f by transforming the original image 41.

Upon implementing the correcting process shown in FIG. 13, the controller 16 using the camera 18 attached to the hinge 17 calculates the position of a user's face (or a user's eye) based on the angle information supplied by the camera 18. That is, the camera 18 carries out face recognition or eye recognition based on the captured image so as to supply an electric signal, representing the position of a user's face or a user's eye, to the controller 16. Using the predetermined setting information which is prepared in advance, the controller 16 carries out a transforming process (or a correcting process) on image data in conformity with the angle information. Herein, the predetermined setting information indicates an initial value of a distance from the display device 1 to a user or information used to calculate a distance to a user based on information of the captured user's face or the like. Next, a method of detecting the angle information representing the positions of eyes of users 33a to 33c by use of the camera 18 will be described with reference to FIGS. 11 and 12. FIG. 11 schematically shows the positions of the users 33a to 33c in view of the camera 18. FIG. 12 schematically shows an image 71 corresponding to the users 33a to 33c captured by the camera 18. In FIGS. 11 and 12, the positions of the users 33a to 33c correspond to the positions of the users 33a to 33c shown in FIG. 5.

In FIG. 11, an angular range (i.e. an angle of view) which can be captured by the camera 18 in a horizontal direction is set to 80°. In this case, as shown in FIG. 12, the image 71 captured by the camera 18 is an image covering a range of 40° in the left and right of the center position, i.e. "0°". FIG. 12 shows an angle of view of the camera 18 along with a number line; hence, the camera 18 detects the position of the captured eyes or face of the user 33 in units of ten degrees in a range from 40° left to 40° right. That is, the positions of nine points are set to the number line. In FIG. 12, the position of the eyes or face of the user 33 is set to second, fifth, and eighth points from the left along with the number line. That is, the camera 18 detects the position of the user 33c as "30° left", the position of the user 33a as "0°", and the position of the user 33b as "30° right". The camera 18 supplies an electric signal, representing the angle information, to the controller 16. The controller 16 carries out software control to correct the images 41c and 41d to the images 41e and 41f based on the angle information.

Next, a correcting process for an image transforming process, which the controller 16 carries out in response to the position of the user 32 detected by the camera 18 when the user 32 disposed at a reference position P2a moves to a position P2b or a position P2c, will be described with reference to FIG. 8 and FIGS. 14 to 16. Similar to the portrait orientation of the display device 1 shown in FIG. 5 which is described with reference to FIGS. 11 to 13, the landscape orientation of the display device 1 shown in FIG. 8 will be described with reference to FIGS. 14 to 16.

Figure 16:
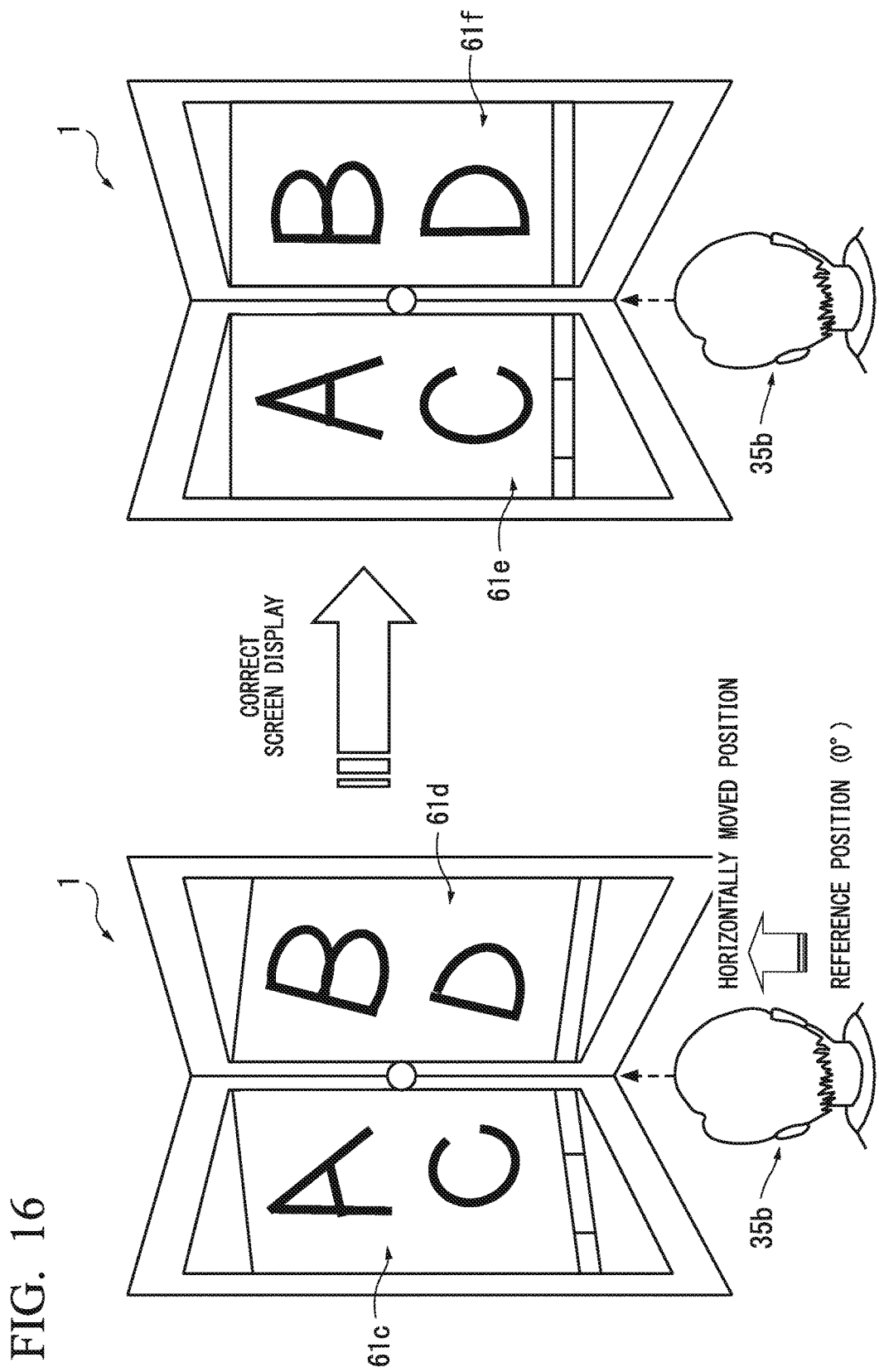
FIG. 16 is an explanatory diagram used to explain a correcting process of images, depending on a user moving in a vertical direction, displayed with the display device in the landscape orientation shown in FIG. 8.

As shown in FIG. 8, a study will be made with respect to the case where the eyes or face of the user 32 moves in a direction perpendicular to a scrolling direction (i.e. a direction of the arrow 53) so as to move from the reference position P2a to the position P2b or the position P2c. In this case, the user 32 after movement cannot visually recognize a continuous plane image since the images displayed on the displays 12 and 14 are bent in a vertical direction. The left-side illustration of FIG. 16 schematically shows images 61c and 61d (i.e. images before correction) in view of a user 35b moved to the position Pb2. The image 61c corresponds to the image 61a of the display 14 viewed by the user 35b at the position Pb2, while the image 61d corresponds to the image 61b of the display 12 viewed by the user 35b. The user 35b may visually recognize a discontinuous plane image as the images 61c and 61d before correction. The right-side illustration of FIG. 16 shows images 61e and 61f, which are produced by correcting the images 61c and 61d, in view of the user 35b. The controller 16 corrects the images 61c and 61d based on the captured information of the camera 18 so as to produce the images 61e and 61f which the user 35b can visually recognize a continuous plane image.

Figure 14:
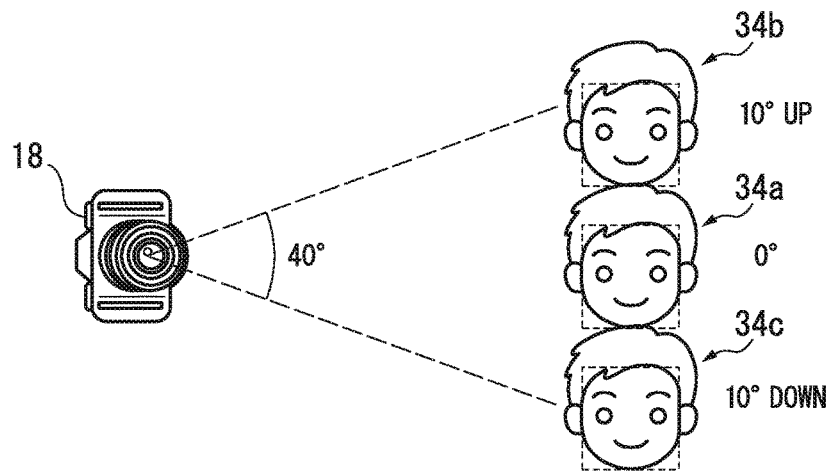
FIG. 14 schematically shows positions of a user moving in a vertical direction viewed by a camera of the display device in the landscape orientation shown in FIG. 8.
Figure 15:
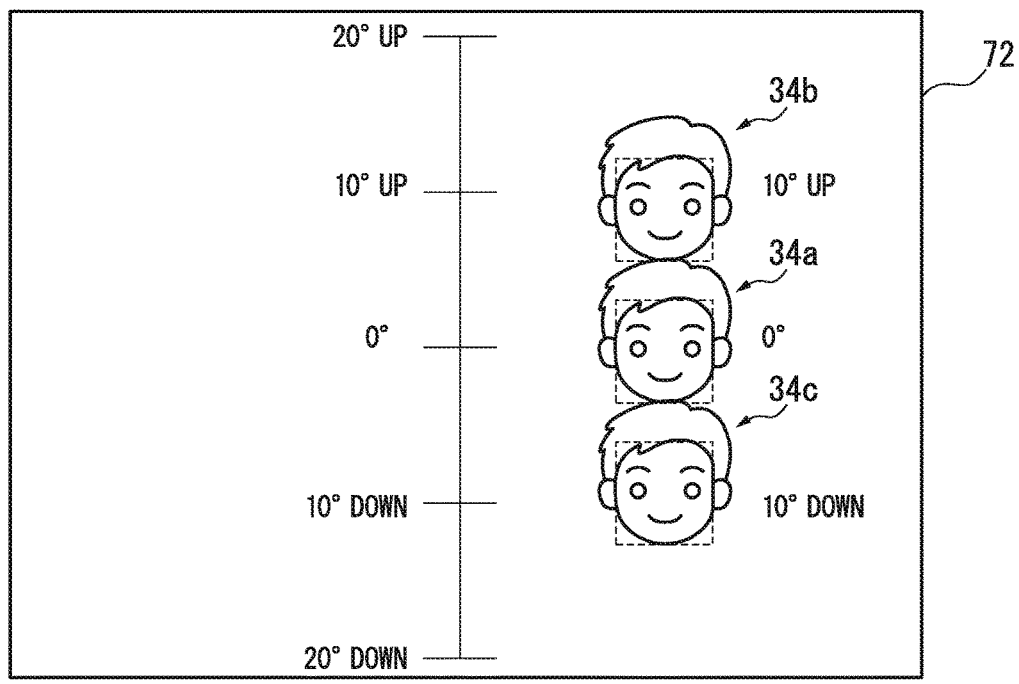
FIG. 15 schematically shows images of a user, moving in a vertical direction, captured by a camera of the display device in the landscape orientation shown in FIG. 8.

Upon implementing the correcting process shown in FIG. 16, the controller 16 using the camera 18 attached to the hinge 17 obtains the angle information representing the position of the user's eyes or face. That is, the camera 18 carries out face recognition or eye recognition based on the captured image so as to supply an electric signal, i.e. the angle information representing the position of the user's face or eyes, to the controller 16. The controller 16 corrects or transforms images based on the angle information. A method of detecting the angle information, representing the position of eyes of users 34a to 34c, by use of the camera 18 will be described with reference to FIGS. 14 and 15. FIG. 14 schematically shows the positions of the users 34a to 34c in view of the camera 18. FIG. 15 schematically shows an image 72 representing the users 34a to 34c captured by the camera 18. In FIGS. 14 and 15, the positions of the users 34a, 34b, and 34c correspond to the positions P2a, P2b, and P2c shown in FIG. 8.

In FIG. 14, an angular range (i.e. an angle of view) which the camera 18 can capture images in a vertical direction is set to 40°. In this case, as shown in FIG. 15, the image 72 captured by the camera 18 covers a range of 20° in the upper and lower side of the center, i.e. "0°". In FIG. 15, the position of the user's eyes or face is set to the number line in units of ten degrees from 20° up to 20° down. That is, five points are set to the number line. In FIG. 15, the camera 18 detects the position of the user's eyes or face, which is set to second, third, and fourth points along with the number line, as 10° up, 0°, and 10° down. The camera 18 supplies an electric signal, representing the angle information, to the controller 16. As shown in FIG. 16, the controller 16 implements software control to correct the images 61c and 61d to the images 61e and 61f.

As described above, the display device 1 of the present embodiment is designed to produce a single plane image by use of the displays 12 and 14 by transforming two images such that a user can visually recognize a continuous plane image. Thus, it is possible for the display device 1 of the present embodiment to prevent user's motion sickness when a user concurrently carries out a scrolling operation on two screens.

The present invention is not necessarily limited to the foregoing embodiment. For example, it is possible to install a plurality of cameras or a distance-measuring device using sound waves or infrared rays in a display device so as to detect a user's position based on an angle and a distance, thus transforming images depending on the detected position. Additionally, it is possible to carry out an image correction according to positional shifting in a slanting direction, combining user's movements in horizontal and vertical directions relative to a display device, compared to a scrolling direction. In this connection, the display device of the present invention can be configured using one or multiple computers and programs, wherein those programs can be provided using computer-readable storage media or through communication lines.

INDUSTRIAL APPLICABILITY

The present invention is applied to a display device which combines multiple screens to display a single continuous plane image; hence, the present invention is able to combine multiple images such that users can naturally and visually recognize images depending on open-close angles or viewing positions of electronic books and folding information terminals.

REFERENCE SIGNS LIST 1 display device
11, 13 case
12, 14 display
15 open-close angle detector
16 controller
17 hinge
18 camera

What is claimed is:

1. A display device comprising:
a plurality of cases having an opening/closing mechanism;
a plurality of displays installed in the plurality of cases;
an open-close angle detector configured to detect an open-close angle between the plurality of cases;
a controller configured to carry out a transforming process on a plurality of images, displayed on the plurality of displays, based on the open-close angle detected by the open-close angle detector such that the plurality of images is visually recognized as a continuous plane image; and
an orientation detector configured to detect an orientation of the plurality of cases;
wherein the controller changes a transforming ratio, applied to the plurality of images, based on the detected orientation by changing compression ratios at pixel positions of at least one image of the plurality of images in a horizontal direction as a distance from a hinge of the display device to the pixel positions becomes longer in a vertical direction or changing the compression ratios at pixel positions of the at least one image in a vertical direction as the distance from the hinge of the display device to the pixel positions becomes longer in a horizontal direction.

2. The display device according to claim 1, further comprising a position detector configured to detect a user's position concerning a user's specific part, wherein the controller carries out a correcting process such that the plurality of images displayed on the plurality of displays is visually recognized as a continuous plane image at the user's position detected by the position detector.

3. The display device according to claim 1, wherein the controller switches the transforming process of the plurality of images between a portrait orientation of aligning the plurality of cases in a vertical direction and a landscape orientation of aligning the plurality of cases in a horizontal direction.

4. The display device according to claim 1, wherein the controller changes a scrolling direction applied to the plurality of images displayed on the plurality of displays in accordance with the transforming process.

5. The display device according to claim 3, wherein the controller adapted to the portrait orientation changes the transformation ratio such that the at least one image is compressed at a higher compression ratio in the horizontal direction as the distance from the hinge to the pixel positions becomes longer in the vertical direction.

6. The display device according to claim 3, wherein the controller adapted to the landscape orientation changes the transformation ratio such that the at least one image is compressed at a higher compression ratio in the vertical direction as the distance from the hinge to the pixel positions becomes longer in the horizontal direction.

7. An image transforming method adapted to a plurality of images displayed on a plurality of displays installed in a plurality of cases having an opening/closing mechanism, comprising:
detecting an open-close angle between the plurality of cases;
detecting an orientation of the plurality of cases;
carrying out a transforming process on the plurality of images displayed on the plurality of displays based on the open-close angle such that the plurality of images is visually recognized as a continuous plane image; and
changing a transforming ratio, applied to the plurality of images, based on the detected orientation by changing compression ratios at pixel positions of at least one image of the plurality of images in a horizontal direction as a distance from a hinge of the display device to the pixel positions becomes longer in a vertical direction or changing the compression ratios at pixel positions of the at least one image in a vertical direction as the distance from the hinge of the display device to the pixel positions becomes longer in a horizontal direction.

8. The image transforming method according to claim 7, wherein the method further comprises switching the transforming process of the plurality of images between a portrait orientation of aligning the plurality of cases in a vertical direction and a landscape orientation of aligning the plurality of cases in a horizontal direction,
and wherein the transformation ratio adapted to the portrait orientation is changed such that the at least one image is compressed at a higher compression ratio in the horizontal direction as the distance from the hinge to the pixel positions becomes longer in the vertical direction.

9. The image transforming method according to claim 7, wherein the method further comprises switching the transforming process of the plurality of images between a portrait orientation of aligning the plurality of cases in a vertical direction and a landscape orientation of aligning the plurality of cases in a horizontal direction,
and wherein the transformation ratio adapted to the landscape orientation is changed such that the at least one image is compressed at a higher compression ratio in the vertical direction as the distance from the hinge to the pixel positions becomes longer in the horizontal direction.

10. A non-transitory computer-readable storage medium storing an image transforming process according to claim 7.

* * * * *